US012781023B2

(12) United States Patent
Yamasaki

(10) Patent No.: US 12,781,023 B2
(45) Date of Patent: Nov. 3, 2026

(54) POLYOLEFIN RESIN FOAM PARTICLES, METHOD FOR PRODUCING SAME, AND MOLDED ARTICLE OF POLYOLEFIN RESIN FOAM PARTICLES

(71) Applicant: JSP CORPORATION, Chiyoda-ku (JP)

(72) Inventor: Shobu Yamasaki, Mie (JP)

(73) Assignee: JSP CORPORATION, Chiyoda-ku (JP)

( * ) Notice: Subject to any disclaimer, the term of this patent is extended or adjusted under 35 U.S.C. 154(b) by 735 days.

(21) Appl. No.: 18/040,853

(22) PCT Filed: May 25, 2021

(86) PCT No.: PCT/JP2021/019711
§ 371 (c)(1),
(2) Date: Feb. 7, 2023

(87) PCT Pub. No.: WO2022/034725
PCT Pub. Date: Feb. 17, 2022

(65) Prior Publication Data

US 2023/0348693 A1 Nov. 2, 2023

(30) Foreign Application Priority Data

Aug. 13, 2020 (JP) ................................ 2020-136590

(51) Int. Cl.

| | |
|---|---|
| ***C08J 9/16*** | (2006.01) |
| ***C08J 9/00*** | (2006.01) |
| ***C08J 9/18*** | (2006.01) |
| ***C08K 3/04*** | (2006.01) |
| ***C08K 5/17*** | (2006.01) |

(52) U.S. Cl.
CPC ............... *C08K 5/17* (2013.01); *C08J 9/0066* (2013.01); *C08J 9/16* (2013.01); *C08J 9/18* (2013.01); *C08K 3/04* (2013.01); *C08J 2323/14* (2013.01)

(58) Field of Classification Search
CPC ......................................................... C08J 9/16
See application file for complete search history.

(56) References Cited

U.S. PATENT DOCUMENTS

| | | | | |
|---|---|---|---|---|
| 9,783,655 | B2 | 10/2017 | Lips et al. | |
| 10,316,169 | B2 | 6/2019 | Lips et al. | |
| 2004/0171708 | A1* | 9/2004 | Yoshizawa ............ | C08J 9/0066 521/56 |
| 2005/0004285 | A1 | 1/2005 | Delabroye et al. | |
| 2009/0111699 | A1* | 4/2009 | Negishi ................ | C07D 211/94 524/99 |
| 2010/0190898 | A1 | 7/2010 | Negishi et al. | |
| 2013/0023611 | A1 | 1/2013 | Negishi et al. | |
| 2015/0284535 | A1* | 10/2015 | Lips ..................... | C08K 5/3435 524/102 |
| 2016/0229989 | A1 | 8/2016 | Lips et al. | |
| 2017/0204240 | A1 | 7/2017 | Van Ravestyn et al. | |
| 2017/0369679 | A1 | 12/2017 | Lips et al. | |

FOREIGN PATENT DOCUMENTS

| | | | |
|---|---|---|---|
| CN | 1646615 | A | 7/2005 |
| JP | 2004-263033 | A | 9/2004 |
| JP | 2005-519161 | A | 6/2005 |
| JP | 4077745 | B2 | 4/2008 |
| JP | 2010-209145 | A | 9/2010 |
| JP | 2011-236369 | A | 11/2011 |
| JP | 2013-35949 | A | 2/2013 |
| JP | 2020-117582 | A | 8/2020 |
| KR | 10-2014-0138915 | A | 12/2014 |
| WO | WO 2005/082852 | A1 | 9/2005 |

(Continued)

OTHER PUBLICATIONS

Extended European Search Report issued on Oct. 26, 2023 in European Patent Application No. 21855804.7, 4 pages.

(Continued)

*Primary Examiner* — Irina Krylova
(74) *Attorney, Agent, or Firm* — Oblon, McClelland, Maier & Neustadt, L.L.P.

(57) ABSTRACT

A polyolefin-based resin expanded bead contains a base resin containing a polyolefin-based resin as a main component, carbon black, and a flame-retardant. A bulk density of the polyolefin-based resin expanded beads is 10 to 100 kg/$m^3$. A blending amount of the carbon black is 0.5 to 10 parts by mass based on 100 parts by mass of the base resin. The flame-retardant contains a hindered amine-based compound represented by the following general formula (I), and a blending amount of the hindered amine-based compound is 0.01 to 1 parts by mass based on 100 parts by mass of the base resin.

(I)

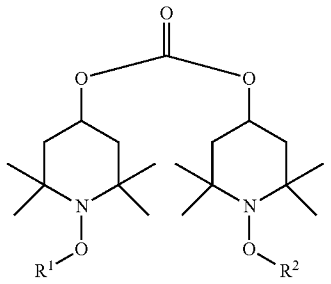

20 Claims, 1 Drawing Sheet

(56) References Cited

FOREIGN PATENT DOCUMENTS

| | | |
|---|---|---|
| WO | WO 2013/136285 A1 | 9/2013 |
| WO | WO 2016/052739 A1 | 4/2016 |

OTHER PUBLICATIONS

Written Opinion of the International Searching Authority issued on Jul. 27, 2021 in PCT/JP2021/019711, 4 pages.
Combined Taiwanese Office Action and Search Report Issued Jan. 16, 2025, in Taiwanese Patent Application No. 110119444 (with unedited computer-generated English translation), 20 pages.
International Search Report issued Jul. 27, 2021 in PCT/JP2021/019711 filed on May 25, 2021, 3 pages.
Brazilian Office Action issued May 21, 2024 in Brazilian Patent Application No. BR112023002363-7, (with English translation), 5 pages.
Korean Office Action issued on Nov. 19, 2025 in Korean Patent Application No. 10-2023-7005011 (with unedited computer-generated English translation), 13 pages.
Second Office Action dated May 4, 2026, issued in Brazilian Patent Application No. BR 112023002363-7 with English machine translation, 8 pages.

* cited by examiner

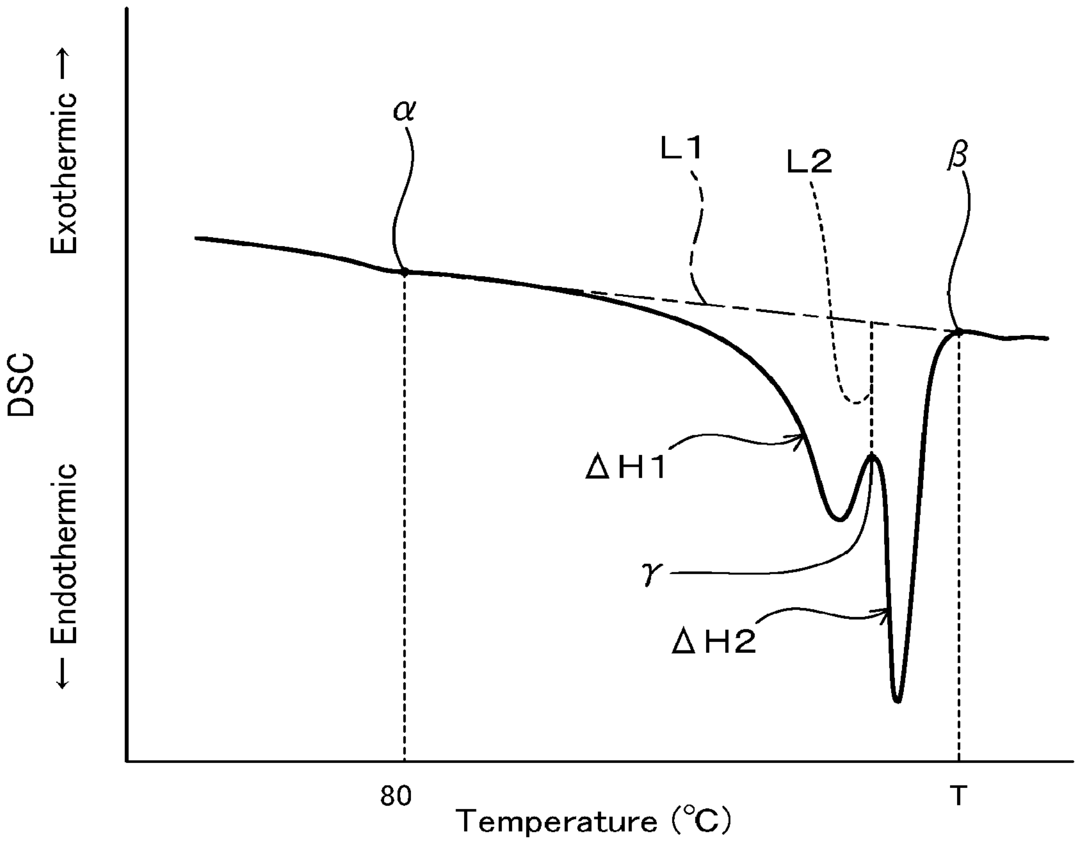
Exothermic →
DSC
← Endothermic
α
L1
L2
β
ΔH1
γ
ΔH2
80
T
Temperature (°C)

POLYOLEFIN RESIN FOAM PARTICLES, METHOD FOR PRODUCING SAME, AND MOLDED ARTICLE OF POLYOLEFIN RESIN FOAM PARTICLES

CROSS-REFERENCE TO RELATED APPLICATIONS

The present application is the national stage of international application PCT/JP2021/019711, filed on May 25, 2021, and claims the benefit of the filing date of Japanese Appl. No. 2020-136590, filed on Aug. 13, 2020, the content of each of which is incorporated by reference.

TECHNICAL FIELD

The present invention relates to a polyolefin-based resin expanded bead, a method for producing the polyolefin-based resin expanded bead, and a molded article of polyolefin-based resin expanded beads.

BACKGROUND ART

Molded articles of polyolefin-based resin expanded beads which are obtained by in-mold molding of polyolefin-based resin expanded beads are used for various applications such as packaging materials, automobile members, and building materials. Such molded articles of polyolefin-based resin expanded beads are colored with carbon black in some cases. A hindered amine-based flame-retardant may be added to a molded article of polyolefin-based resin expanded beads for the purpose of enhancing flame retardancy (e.g., Patent Document 1).

PRIOR ART LITERATURE

Patent Documents

Patent Document 1: Japanese Patent No. 4077745

SUMMARY OF THE INVENTION

Problems to be Solved by the Invention

In recent years, it has been desired to improve the appearance characteristics of a molded article of polyolefin-based resin expanded beads which contains a hindered amine-based flame-retardant and carbon black as in Patent Document 1.

In a molded article of expanded beads which contains carbon black, when the molded article has a low density, the burning speed and the combustibility tends to increase because the resin amount in the molded article is less. Therefore, for exhibiting desired flame retardancy, it is necessary to increase the amount of the hindered amine-based flame-retardant added. However, when the amount of the hindered amine-based flame-retardant added is increased, unevenness in color tone of the surface of the molded article of expanded beads may increase.

The present invention has been made in view of such circumstances, and an object of the present invention is to provide a polyolefin-based resin expanded bead capable of giving a molded article of expanded beads which has excellent flame retardancy and excellent appearance characteristics, a method for producing the polyolefin-based resin expanded bead, and a molded article of polyolefin-based resin expanded beads which is obtained by in-mold molding of the polyolefin-based resin expanded beads.

Means for Solving the Problems

One aspect of the present invention is a polyolefin-based resin expanded bead containing a base resin containing a polyolefin-based resin as a main component;

- carbon black, and
- a flame-retardant, wherein
- a bulk density of the polyolefin-based resin expanded beads is 10 to 100 kg/$m^3$,
- a blending amount of the carbon black is 0.5 to 10 parts by mass based on 100 parts by mass of the base resin,
- the flame-retardant contains a hindered amine-based compound represented by the following general formula (I), and
- a blending amount of the hindered amine-based compound is 0.01 to 1 parts by mass based on 100 parts by mass of the base resin.

[Chemical Formula 1]

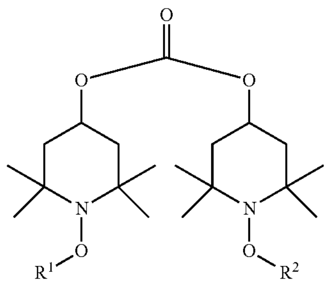

(I)

In the general formula (I), $R^1$ and $R^2$ each independently represent an alkyl group having 1 to 20 carbon atoms.

Another aspect of the present invention is a molded article of polyolefin-based resin expanded beads which is obtained by in-mold molding of the polyolefin-based resin expanded beads of the above-mentioned aspect.

Still another aspect of the present invention is a method for producing a polyolefin-based resin expanded bead containing a base resin containing a polyolefin-based resin as a main component, carbon black, and a flame-retardant and having a bulk density of 10 to 100 kg/$m^3$,

- the method including an expanding step of expanding an expandable polyolefin-based resin bead containing the base resin, the carbon black, the flame-retardant, and an expanding agent and dispersed in an aqueous medium in a sealed container by discharging the expandable polyolefin-based resin bead together with the aqueous medium from the sealed container to a pressure lower than that in the sealed container, in which
- a blending amount of the carbon black is 0.5 to 10 parts by mass based on 100 parts by mass of the base resin,
- the flame-retardant contains a hindered amine-based compound represented by the following general formula (1), and
- a blending amount of the hindered amine-based compound is 0.01 to 1 parts by mass based on 100 parts by mass of the base resin.

[Chemical Formula 2]

(I)

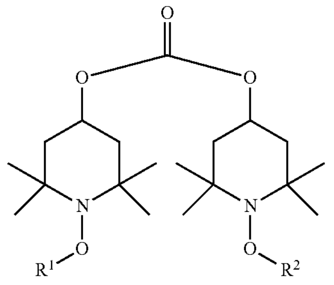

In the general formula (I), $R^1$ and $R^2$ each independently represent an alkyl group having 1 to 20 carbon atoms.

Effects of the Invention

The polyolefin-based resin expanded bead (hereinafter, referred to as "expanded bead") contains a base resin containing a polyolefin-based resin as a main component, carbon black, and a flame-retardant containing the specific hindered amine-based compound. The specific hindered amine-based compound can reduce variation in cell diameter of the expanded beads. Unevenness of color tone in a molded article of polyolefin-based resin expanded beads (hereinafter, referred to as a "molded article of expanded beads") can be reduced by in-mold molding of expanded beads having little variation in cell diameter.

When variation in cell diameter of expanded beads decreases, variation in thickness of cell films of the expanded beads decreases. As a result, an easily burnable portion is hardly formed in a molded article of expanded beads which is obtained by in-mold molding the expanded beads. Therefore, a molded article of expanded beads which is obtained by in-mold molding of the expanded beads has excellent flame retardancy.

As described above, a molded article of expanded beads which has excellent flame retardancy and excellent appearance characteristics can be obtained by in-mold molding of the expanded beads.

The molded article of expanded beads is formed of the expanded beads. Therefore, the molded article of expanded beads can have color tone with reduced unevenness, and has excellent flame retardancy.

The method for producing a polyolefin-based resin expanded bead includes an expanding step of expanding an expandable polyolefin-based resin bead (hereinafter, referred to as "an expandable resin bead") containing a base resin, carbon black, a flame-retardant, and an expanding agent and dispersed in an aqueous medium in a sealed container by discharging the expandable resin bead together with the aqueous medium from the sealed container to a pressure lower than that in the sealed container. Therefore, the method for producing a polyolefin-based resin expanded bead enables reduction of variation in cells formed in the expanded beads in the expanding step. As a result, the expanded bead can be easily obtained.

As described above, it is possible to provide a polyolefin-based resin expanded bead capable of giving a molded article of expanded beads which has excellent flame retardancy and excellent appearance characteristics, a method for producing the polyolefin-based resin expanded bead, and a molded article of polyolefin-based resin expanded beads.

BRIEF DESCRIPTION OF THE DRAWING

FIG. 1 is an illustrative diagram showing a calculating method for an area of a high-temperature peak.

MODES FOR CARRYING OUT THE INVENTION

As used herein, the term "to" with numerical values or physical property values described before and after the term means inclusion of the values before and after the term. A numerical value or physical property value described as a lower limit means being not less than the numerical value or physical property value, and a numerical value or physical property value described as an upper limit means being not more than the numerical value or physical property value.

(Expanded Bead)

The expanded bead contains a base resin, carbon black, and a flame-retardant.

<Base Resin>

The main component of the base resin in the expanded bead is a polyolefin-based resin. Herein, the main component of the base resin refers to a component contained at a mass ratio of 50 mass % or more in the base resin. Herein, the polyolefin-based resin refers to a homopolymer of an olefin monomer such as ethylene, propylene, butene, or pentene and a copolymer containing an olefin monomer-derived component at 60 mol % or more.

More specifically, as the polyolefin-based resin, for example, polyethylene-based resins, ethylene-based ionomers, polypropylene-based resins, polybutene, polypentene, and copolymers of an olefin monomer and a monomer copolymerizable with an olefin monomer, such as a styrene monomer can be used.

As for the polyethylene-based resin, ethylene homopolymers such as high-density polyethylene, medium-density polyethylene, branched low-density polyethylene, linear low-density polyethylene, and linear ultralow-density polyethylene; and ethylene-based copolymers containing an ethylene monomer-derived component at 60 mol % or more, such as ethylene-propylene random copolymers, ethylene-propylene block copolymers, ethylene-butene block copolymers, ethylene-butene random copolymers, ethylene-vinyl acetate copolymers, and ethylene-methyl methacrylate copolymers are given as examples.

As for the ethylene-based ionomer, ionomers in which molecules of an ethylene-methacrylic acid copolymer are crosslinked with a metal ion is given as example.

As for the polypropylene-based resin, propylene homopolymers such as isotactic polypropylene, syndiotactic polypropylene, and atactic polypropylene; and propylene-based copolymers containing a propylene monomer-derived component at 60 mol % or more, such as propylene-ethylene random copolymers, propylene-ethylene block copolymers, propylene-butene random copolymers, propylene-butene block copolymers, propylene-ethylene-butene terpolymers, propylene-acrylic acid copolymers, and a propylene-maleic anhydride copolymers are given as examples. The base resin may contain one or two or more resins selected from these polyolefin-based resins.

It is preferable that the base resin contains a polypropylene-based resin. A molded article of expanded beads which contains a polypropylene resin is excellent in shock-absorbing properties, recovery from compressive strain, and lightweight properties, and therefore can be particularly suitably used for applications such as packaging materials, automobile members, and building materials.

In the base resin, materials other than the polyolefin-based resin, such as other resins or elastomers, may be contained in addition to the polyolefin-based resin as long as the purpose and the operational effect of the present invention are not impaired. As for the resin other than the polyolefin-based resin, thermoplastic resins such as polystyrene-based resins, polyamide-based resins, and polyester-based resins are given as examples. As for the elastomer other than the polyolefin-based resin, olefin-based thermoplastic elastomers and styrene-based thermoplastic elastomers are given as examples. The ratio of the polyolefin-based resin in the base resin is preferably 70 mass % or more, more preferably 80 mass % or more, still more preferably 90 mass % or more, and it is particularly preferable that the base resin is composed only of the polyolefin-based resin.

<Carbon Black>

In the expanded bead, 0.5 to 10 parts by mass of carbon black is blended based on 100 parts by mass of the base resin. When the blending amount of carbon black is in the above-described specific range, it is possible to sufficiently color expanded bead and a molded article of expanded beads which is obtained by in-mold molding of expanded beads. If the blending amount of carbon black is excessively small, there is a possibility that coloring with the carbon black is insufficient, so that unevenness is likely to occur in the color tone of the molded article of expanded beads. If the blending amount of carbon black is excessively large, the flame retardancy of the molded article of expanded beads may be deteriorated.

From the viewpoint of more effectively suppressing unevenness in color tone of the molded article of expanded beads, the blending amount of carbon black is preferably 1 part by mass or more, more preferably 2 parts by mass or more, based on 100 parts by mass of the base resin. From the viewpoint of more reliably avoiding deterioration of the flame retardancy of the molded article of expanded beads, the blending amount of carbon black is preferably 7 parts by mass or less, more preferably 4 parts by mass or less, based on 100 parts by mass of the base resin.

Examples of the carbon black that can be used include channel black, roller black, furnace black, thermal black, acetylene black, and Ketjen black. The carbon black is preferably furnace black which is excellent in balance between dispersibility in the polyolefin-based resin and material cost.

<Flame-Retardant>

The expanded bead contains a flame-retardant. The flame-retardant contains at least a hindered amine-based compound represented by the following general formula (I).

[Chemical Formula 3]

(I)

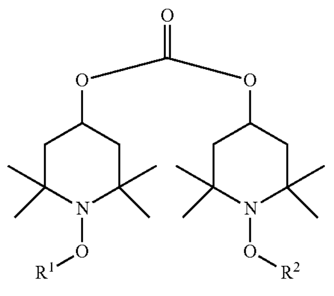

In the general formula (I), $R^1$ and $R^2$ each independently represent an alkyl group having 1 to 20 carbon atoms. $R^1$ and $R^2$ in the general formula (I) may be a linear aliphatic hydrocarbon group, a branched aliphatic hydrocarbon group, or an alicyclic hydrocarbon group. $R^1$ and $R^2$ in the general formula (I) are each preferably a linear aliphatic hydrocarbon group. From the viewpoint of further enhancing the effect of improving the flame retardancy by the flame-retardant, the number of carbon atoms in each of $R^1$ and $R^2$ in the general formula (I) is preferably 5 to 15, particularly preferably 11.

The hindered amine-based compound has not only an action of improving flame retardancy in itself but also an action of reducing variation in cell diameter of the expanded beads. That is, as compared to a hindered amine-based flame-retardant which has been heretofore used for polypropylene-based resin expanded bead, the above-described specific hindered amine-based compound has a smaller molecular weight, and is therefore superior in compatibility with the base resin. Therefore, the hindered amine-based compound has a property of being hardly aggregated in the base resin. Use of such hindered amine-based compound as a flame-retardant enables suppression of formation of cell nuclei which is caused by an aggregate of the flame-retardant in the process of producing the expanded bead. As a result, it is possible to reduce variation in cell diameter of the expanded beads when the cell diameters of the plurality of expanded beads are compared.

It is assumed that when variation in cell diameter of the expanded beads is reduced, it is also possible to reduce variation in thickness of cell films of expanded beads. Since the polyolefin-based resin as a main component in the base resin is a burnable resin, a thick portion of the cell film is likely to burn when there is large variation in thickness of cell films. Therefore, it is considered that by in-mold molding of expanded beads having little variation in cell diameter, variation in thickness of the cell films of the resulting molded article of expanded beads can be reduced, so that the molded article of expanded beads has excellent flame retardancy.

As described above, by using the hindered amine-based compound as a flame-retardant, the flame retardancy improving action of the hindered amine-based compound itself and the flame retardancy improving action resulting from reduction of variation in cell diameter can be exhibited in a synergistic manner. As a result, it is possible to obtain a molded article of expanded beads which has excellent flame retardancy. By using the hindered amine-based compound as a flame-retardant, the blending amount can be reduced as compared to a conventional hindered amine-based flame-retardant while excellent flame retardancy is secured.

The blending amount of the hindered amine-based compound is 0.01 to 1 parts by mass based on 100 parts by mass of the base resin. When the blending amount of the hindered amine-based compound is in the above-describe specific range, variation in cell diameter of expanded beads can be reduced to obtain a molded article of expanded beads which has excellent flame retardancy. If the blending amount of the hindered amine-based compound is excessively small, the effect of improving the flame retardancy by the hindered amine-based compound tends to be insufficient. If the blending amount of the hindered amine-based compound is excessively large, variation in cell diameter of the expanded beads may be likely to increase, resulting in deterioration of flame retardancy and deterioration of appearance characteristics of the molded article of expanded beads.

From the viewpoint of more effectively suppressing occurrence of unevenness in color tone of the molded article of expanded beads and obtaining a molded article of expanded beads which has excellent flame retardancy, the blending amount of the hindered amine-based compound is preferably 0.05 parts by mass or more, more preferably 0.1 parts by mass or more, based on 100 parts by mass of the base resin. From the viewpoint of more reliably avoiding an increase in variation in cell diameter of expanded beads, the blending amount of the hindered amine-based compound is preferably 0.8 parts by mass or less, more preferably 0.5 parts by mass or less, based on 100 parts by mass of the base resin.

The molecular weight of the hindered amine-based compound is preferably 600 to 800. In this case, it is possible to further reduce variation in cell diameter of the expanded beads, more effectively suppress occurrence of unevenness in color tone in the molded article of expanded beads, and obtain a molded article of expanded beads which has excellent flame retardancy. When one type of hindered amine-based compound is contained in the expanded bead, the molecular weight of the hindered amine-based compound is the sum of the atomic weights of atoms forming the hindered amine-based compound.

When a plurality of types of hindered amine-based compounds are contained in the expanded bead, the molecular weight of the hindered amine-based compound is the weighted average of the molecular weights of the hindered amine-based compounds contained in the expanded bead. When the molar ratios of individual hindered amine-based compounds contained in the expanded bead are unknown, the number average molecular weight determined by GPC using polystyrene as a standard substance can be taken as a molecular weight of the hindered amine-based compounds.

The flame-retardant in the expanded bead may be consisted of one or two or more compounds selected from hindered amine-based compounds represented by the general formula (I). The flame-retardants in the expanded bead may include, in addition to the hindered amine-based compound represented by the general formula (I), flame-retardants other than the above-described hindered amine-based compound. As for other flame-retardants, halogen-based flame-retardants, phosphorus-based flame-retardants, metal hydroxides, and hindered amine-based flame-retardants other than the hindered amine-based compound represented by the general formula (I) are given as examples.

When the flame-retardants in the expanded bead include flame-retardants other than the hindered amine-based compound represented by the general formula (I), the blending amount of the other flame-retardants may be in any range as long as the above-described operational effect is not impaired. For example, the blending amount of the hindered amine-based compound represented by the general formula (I) in the flame-retardant is preferably 40 mass % or more, more preferably 70 mass % or more, still more preferably 90 mass % or more, and it is particularly preferable that the flame-retardant is formed only of the hindered amine-based compound.

<Additive>

The expanded bead may contain additives such as a flame-retardant aid, a cell adjusting agent, a catalyst neutralizing agent, a lubricant, a crystal nucleating agent, and an antistatic agent. The content of the additives in the expanded bead is, for example, preferably 15 mass % or less, more preferably 10 mass % or less, still more preferably 5 mass % or less, particularly preferably 1 mass % or less.

<Bulk Density of Expanded Beads>

The bulk density of the expanded beads is 10 to 100 $kg/m^3$. The bulk density of the expanded beads is preferably 50 $kg/m^3$ or less, more preferably 30 $kg/m^3$ or less, still more preferably 20 $kg/m^3$ or less. In this case, the lightweight properties of the molded article of expanded beads can be further improved. Moreover, if the bulk density of the expanded beads decreases, the burning speed of the molded article of expanded beads is likely to increase because the amount of the base resin in the expanded bead decreases. Even in this situation, the expanded bead enables the molded article of expanded beads to secure excellent flame retardancy by using the specific hindered amine-based compound as a flame-retardant.

On the other hand, from the viewpoint of further enhancing the rigidity of the molded article of expanded beads, the bulk density of the expanded beads is preferably 15 $kg/m^3$ or more, more preferably 18 $kg/m^3$ or more, still more preferably 20 $kg/m^3$ or more.

The bulk density of the expanded beads is a value calculated by the following method. First, 500 or more expanded beads are left in an environment at an air temperature of 23° C. and a relative humidity of 50% and at 1 atm for 24 hours or more. Expanded beads thus obtained are charged in a measuring cylinder so as to naturally accumulate, and the bulk volume (unit: L) of the expanded beads is read on the scale of the measuring cylinder. The bulk density (unit: $kg/m^3$) of the expanded beads can be obtained by performing unit conversion of a value obtained by dividing the mass (unit: g) of the expanded beads in the measuring cylinder by the bulk volume described above.

<High-Temperature Peak>

It is preferable that the expanded bead has a crystal structure in which one or more endothermic peaks (hereinafter, referred to as a "high-temperature peak") appear on a high-temperature side with respect to the apex of an endothermic peak intrinsic to the polyolefin-based resin (hereinafter, referred to as an "intrinsic peak") in a DSC curve obtained by heat flux differential scanning calorimetry. In this case, the closed cell content of the expanded bead can be further increased, and the molding conditions for forming the molded article of expanded beads can be selected from a wide range. In addition, the rigidity of the resulting molded article of expanded beads can be further enhanced. From such a viewpoint, the amount of heat absorption at a high-temperature peak (hereinafter, referred to as a "heat of high-temperature peak") is preferably 5 J/g or more, more preferably 8 J/g or more. The heat of high-temperature peak is preferably 50 J/g or less, more preferably 40 J/g or less.

The heat of high-temperature peak in the expanded bead can be calculated by the following method. First, about 1 to 3 mg of expanded bead(s) are prepared as a test piece, and a DSC curve is obtained by heating and melting the test piece in accordance with Testing Methods for Heat of Transition of Plastics as specified in JIS K 7122-1987. The temperature range of the DSC curve is from 30° C. to a temperature 30° C. higher than a temperature at the end of the melting peak, and the temperature rise rate during heating is 10° C./min. When the expanded bead has a high-temperature peak, an intrinsic peak ΔH1 and a high-temperature peak ΔH2 having an apex on the high-temperature side with respect to the apex of the intrinsic peak ΔH1 appear in the DSC curve as shown in FIG. 1.

Next, a straight line L1 connecting a point α corresponding to 80° C. on the DSC curve and a point β corresponding to the melting end temperature T of expanded bead is drawn. The melting end temperature T is an end point on the high-temperature side in the high-temperature peak ΔH2, i.e.

an intersection between the high-temperature peak ΔH2 and a baseline on the high-temperature side with respect to the high temperature peak ΔH2 in the DSC curve.

After the straight line L1 is drawn, a straight line L2 is drawn which extends through a maximum point γ present between the intrinsic peak ΔH1 and the high-temperature peak ΔH2 and is parallel to the vertical axis of the graph. By the straight line L2, the intrinsic peak ΔH1 and the high-temperature peak ΔH2 are divided. The amount of heat absorption at the high-temperature peak ΔH2 can be calculated on the basis of the area of a portion surrounded by a portion forming the high-temperature peak ΔH2 in the DSC curve, the straight line L1, and the straight line L2.

After the DSC curve is obtained by the above-described method, when the expanded bead is once cooled and a DSC curve is obtained again, only the intrinsic peak ΔH1 appears in the DSC curve, and the high-temperature peak ΔH2 disappears from the DSC curve.

<Average Cell Diameter $D_{av}$ of Expanded Beads>

The average cell diameter $D_{av}$ of the expanded beads is preferably 50 μm or more, more preferably 70 μm or more, still more preferably 100 μm or more. In this case, the molded article of expanded beads can be effectively colored with a relatively small amount of carbon black. On the other hand, from the viewpoint of suppressing variation in cell diameter of expanded beads, the average cell diameter $D_{av}$ of the expanded beads is preferably 500 μm or less, more preferably 400 μm or less, still more preferably 350 μm or less.

The average cell diameter $D_{av}$ of the expanded beads is a value calculated by the following method. First, the expanded bead is divided approximately in half. By using a scanning electron microscope, an enlarged photograph is obtained in which all the cut surfaces exposed by the division fall within the field of view. On the obtained enlarged photograph, two line segments are drawn from the outermost surface of the expanded bead to the opposite outermost surface through the central portion in such a manner that the angles formed by the adjacent line segments are equal to each other. That is, the angle formed by the adjacent line segments is 90°.

A value obtained by dividing the sum of the lengths of the thus-obtained two line segments by the total number of cells intersecting the line segments is taken as a cell diameter of each expanded bead. The above operation is performed on a plurality of randomly extracted expanded beads, and a value obtained by arithmetically averaging the individually obtained cell diameters of all expanded beads is taken as an average cell diameter $D_{av}$ of the expanded beads. The number of expanded beads used for calculating the average cell diameter can be, for example, 30 or more.

<Variation Coefficient $D_{CV}$ of Cell Diameters>

In a plurality of expanded beads, the degree of variation in cell diameter in comparison between expanded beads is represented by a variation coefficient $D_{CV}$ of cell diameters, and the smaller the value of the variation coefficient $D_{CV}$ of cell diameters, the smaller the variation in the cell diameter of expanded beads. The variation coefficient $D_{CV}$ of cell diameters of the expanded beads is preferably 25% or less, more preferably 23% or less, still more preferably 21% or less. In this case, it is possible to further reduce variation in cell diameter of the expanded beads, more effectively suppress unevenness in color tone of the molded article of expanded beads, and obtain a molded article of expanded beads which has excellent flame retardancy.

Specifically, the variation coefficient $D_{CV}$ of cell diameters of the expanded beads is a value calculated by the following method. First, the cell diameters of a plurality of expanded beads are calculated by the same method as the above-described method for calculating an average cell diameter of expanded beads. Subsequently, an average cell diameter $D_{av}$ (unit: μm) of the expanded beads and a standard deviation $D_{sd}$ (unit: μm) of cell diameters of the expanded beads are calculated on the basis of the cell diameters of the expanded beads. The standard deviation $D_{sd}$ of cell diameters of the expanded beads is a square root of an unbiased variance of the cell diameters. Specifically, the standard deviation $D_{sd}$ of cell diameters of the expanded beads is a value calculated from the following mathematical expression (1). The symbol n in the following mathematical expression (1) represents the total number of expanded beads for which the cell diameter is calculated.

[Mathematical Formula 1]

$$D_{sd} = \left\{ \frac{1}{n-1} \sum_{i=1}^{n} (D_i - D_{av})^2 \right\}^{\frac{1}{2}} \quad (1)$$

The variation coefficient $D_{CV}$ (unit:%) of cell diameters of the expanded beads is a value obtained by expressing a ratio of the standard deviation $D_{sd}$ of cell diameters of the expanded beads to the average cell diameter $D_{av}$, $D_{sd}/D_{av}$, as a percentage.

<Ratio of Variation Coefficient $D_{CV}$ of Cell Diameters of Expanded Beads to Bulk Ratio X, $D_{CV}$/X>

The value of the ratio of the variation coefficient $D_{CV}$ of cell diameters of expanded beads to a bulk ratio X of the expanded beads, $D_{CV}$/X is preferably 0.40 or less. Since the value of the variation coefficient $D_{CV}$ of cell diameters tends to increase as the bulk ratio X becomes larger, it is difficult to simply compare the degree of variation in cell diameter between the expanded beads having different bulk ratios only in terms of the value of the variation coefficient $D_{CV}$ of cell diameters. However, according to the above-described tendency, an indication of the degree of variation in cell diameter with the effect of the bulk ratio X taken into consideration can be obtained by dividing the variation coefficient $D_{CV}$ of cell diameters by the bulk ratio X.

Therefore, by using the value of the ratio of the variation coefficient $D_{CV}$ of cell diameters of the expanded beads to the bulk ratio X, $D_{CV}$/X, the degree of variation in cell diameter between expanded beads having different bulk ratios X can be compared. Specifically, the smaller the value of $D_{CV}$/X, the smaller the variation in cell diameter with the bulk ratio X taken into consideration.

When the ratio of the variation coefficient $D_{CV}$ of cell diameters of the expanded beads to the bulk ratio X of the expanded beads, $D_{CV}$/X is preferably 0.40 or less, more preferably 0.38 or less, still more preferably 0.35 or less, particularly preferably 0.34 or less, variation in cell diameter of the expanded beads can be further reduced. As a result, it is possible to more effectively suppress occurrence of unevenness in color tone of the molded article of expanded beads, and obtain a molded article of expanded beads which has excellent flame retardancy. The lower limit of the ratio of the variation coefficient $D_{CV}$ of cell diameters of the expanded beads to the bulk ratio X of the expanded beads, $D_{CV}$/X is about 0.15. The bulk ratio X of the expanded beads is a value obtained by dividing the density of the base resin by the bulk density of the expanded beads.

(Molded Article of Expanded Beads)

A molded article of expanded beads can be obtained by in-mold molding of the expanded beads. Specifically, the molded article of expanded beads is produced as follows. First, expanded beads are filled in a mold having a cavity corresponding to a shape of a desired molded article, and a large number of expanded beads are heated in the mold by a heating medium such as steam. The expanded beads in the cavity are further foamed and fused together by heating. In this way, a large number of expanded beads are integrated to obtain a molded article of expanded beads which conforms to the shape of the cavity.

<Flame Retardancy>

The flame retardancy of the molded article of expanded beads can be evaluated on the basis of the burning end position, the burning duration, and the burning distance when the flammability test specified in FMVSS (Federal Motor Vehicle Safety Standard) No. 302 is conducted. The flammability test method specified in FMVSS No. 302 is specifically as follows.

First, in-mold molding of the expanded beads is performed, and then the resulting molded article of expanded beads is cut to prepare a plate-like test body. Next, the test body is left standing for 24 hours in an environment at a temperature of 21° C. and a relative humidity of 50% to condition the test material. In the conditioned test body, a start line is drawn at a position 38 mm away from a base end in a length direction, and an end line is drawn at a position 292 mm away from the base end. Subsequently, the test body is attached to a U-shaped frame of a FMVSS No. 302 dedicated chamber.

Next, a burner is ignited, and the amount of gas, the amount of air, and the like are adjusted so that the flame height is 38 mm. In this state, the burner is moved so that the center of the tip of the burner is located in the center of the base end of the test body in a width direction, and the flame of the burner is brought into contact with the test body for 15 seconds. Thereafter, the flame of the burner is taken away from the test body, and the burning duration from the time when the burning position of the test body reaches the start line to the time when the burning ends is measured.

Herein, the degree of the flame retardancy of the molded article of expanded beads is classified as any of the following three levels: a self-extinguishing property, a slow-burning property, and an easy-burning property. Specifically, it is determined that the molded article of expanded beads has a self-extinguishing property when the burning of the test body ends before reaching the start line, or the burning end position of the test body is at 50 mm or less from the start line and the burning duration is 60 seconds or less. It is determined that the molded article of expanded beads has a slow-burning property when the self-extinguishing property is not satisfied and the burning speed obtained by dividing the burning distance from the starting line by the burning duration is 102 mm/min or less. It is determined that the molded article of expanded beads has an easy-burning property when the self-extinguishing property is not satisfied and the burning speed is more than 102 mm/min.

The molded article of expanded beads has preferably a slow-burning property, more preferably a self-extinguishing property when the flammability test specified in FMVSS (Federal Motor Vehicle Safety Standard) No. 302 is conducted. In this case, the molded article of expanded beads can be suitably used for applications in which high flame retardancy is required. In particular, a molded article of expanded beads which has a self-extinguishing property is suitable for applications such as automobile members and building materials.

(Method for Producing an Expanded Bead)

The expanded bead can be prepared by a production method including an expanding step of expanding an expandable polyolefin-based resin bead containing a base resin, carbon black, a flame-retardant, and an expanding agent and dispersed in an aqueous medium in a sealed container by discharging the expandable polyolefin-based resin bead together with the aqueous medium from the sealed container to a pressure lower than that in the sealed container.

In the production method, an expanded bead obtained in the expanding step may be used as the expanded bead as it is. Alternatively, as described later, the expanded bead can be produced by using an expanded bead obtained in the expanding step as a first-step expanded bead and performing a second expanding step on the first-step expanded bead. From the viewpoint of obtaining expanded bead having a lower bulk density, it is preferable to perform the second expanding step after the expanding step.

The expanded bead produced by the production method has little variation in cell diameter, and have excellent flame retardancy. Hereinafter, each step will be described in more detail.

<Bead Forming Step>

The production method may include, prior to the expanding step, a bead forming step of forming a polyolefin-based resin bead (hereinafter, referred to as "resin bead") containing a base resin, carbon black, and a flame-retardant. The method for preparing the resin bead in the bead forming step is not particularly limited. For example, the resin bead can be obtained by kneading and extruding the base resin, carbon black, and the flame-retardant by extrusion molding to prepare a strand, and then cutting the strand to a desired size with a pelletizer or the like. An expandable resin bead can be obtained by impregnating the resin bead obtained in the bead forming step with an expanding agent. The resin bead may be impregnated with the expanding agent in the expanding step or in a step different from the expanding step.

<Expanding Step>

In the expanding step, first, the resin bead or the expandable resin bead is put in a sealed container and dispersed in an aqueous dispersion medium such as water. At this time, a dispersant, a dispersion aid, a surfactant, or the like for dispersing the resin bead in the dispersion medium in the sealed container may be added if necessary.

As the dispersant, for example, inorganic fine particles such as fine particles of aluminum oxide, calcium triphosphate, magnesium pyrophosphate, zinc oxide, kaolin, mica, and the like can be used. One type of these inorganic fine particles may be used, or two or more types thereof may be used in combination. As the dispersion aid, for example, aluminum sulfate and the like can be used. As the surfactant, for example, anionic surfactants such as sodium alkylbenzene sulfonate, sodium dodecylbenzene sulfonate, and sodium alkanesulfonate can be used. These surfactants may be used alone, or used in combination of two or more thereof.

When expandable resin bead is contained in the sealed container, the sealed container is sealed, and the inside of the container is then pressurized and heated to soften the expandable resin bead. Here, if necessary, an expanding agent may be added into the container to further impregnate the expandable resin bead with the expanding agent.

On the other hand, when resin bead is contained in the sealed container, the sealed container is sealed, followed by addition of the expanding agent into the container. In this way, the resin bead is impregnated with the expanding agent to obtain an expandable resin bead. Here, the impregnation of the expanding agent into the resin bead can be promoted by pressurizing and heating the inside of the sealed container.

In any case, by discharging the contents of the sealed container to a pressure lower than the internal pressure of the container after the expandable resin bead is impregnated with a sufficient amount of the expanding agent, the expanded bead or the first-step expanded bead can be obtained by expanding the expandable resin bead.

The carbon black and the flame-retardant may be blended in the resin bead by a method in which the carbon black and the flame-retardant are kneaded with the base resin in the bead forming step; or may be blended in the expandable resin bead by a method in which the carbon black and the flame-retardant are added into the sealed container together with the dispersant and the dispersion aid in the expanding step. From the viewpoint of uniformly dispersing the flame-retardant in the expanded bead, it is preferable to knead the base resin, carbon black, and the flame-retardant to form the polyolefin-based resin bead in the bead forming step.

The blending amount of the carbon black is approximately same as the content of the carbon black in the finally obtained expanded bead. Similarly, the blending amount of the flame-retardant is approximately same as the content of the flame-retardant in the finally obtained expanded bead.

A method so called direct expanding, such as the above-described expanding step, in which the contents of the sealed container are discharged and simultaneously expanded after impregnation of the expanding agent in the sealed container enables the bulk density of the expanded beads to be easily reduced. On the other hand, in the direct expanding, the contents in the sealed container are discharged to a pressure lower than that in the sealed container to be expanded, and therefore variation in cell diameter of the expanded beads is likely to increase. However, in the above-described production method, the specific hindered amine-based compound capable of suppressing an increase in variation in cell diameter is contained in the resin bead. Therefore, using such resin bead in the production method makes it possible to suppress an increase in variation in cell diameter of the expanded beads and easily obtain the expanded bead having a low bulk density.

As the expanding agent for use in the expanding step, organic physical expanding agents such as hydrocarbons and halogenated hydrocarbons, and inorganic physical expanding agents such as carbon dioxide, nitrogen, air, and water can be used. The hydrocarbons that can be used as the organic physical expanding agent include butane, pentane, and hexane. The halogenated hydrocarbon that can be used as the organic physical expanding agent include trichlorofluoromethane, dichlorofluoromethane, and tetrachlorodifluoroethane. As the organic physical expanding agent, the above-described substances may be used alone, or used in combination of two or more thereof. Similarly, as the inorganic physical expanding agent, the above-described substances may be used alone, or used in combination of two or more thereof.

The expanding agent is preferably an inorganic physical expanding agent. When the resin bead is expanded by using the inorganic physical expanding agent, an expanded bead eventually having a high expanding ratio and a narrow particle size distribution can be easily obtained. As the inorganic physical expanding agent, carbon dioxide is preferably used from the viewpoint of more easily obtaining expanded bead having a high expanding ratio and a narrow particle size distribution. Since carbon dioxide is nonflammable, deterioration of the flame retardancy of the expanded bead and the molded article of expanded beads, which is caused by the expanding agent, can be avoided by using carbon dioxide as the expanding agent.

The amount of the expanding agent added can be appropriately set according to the type of the base resin, the type of the expanding agent, the intended bulk density of expanded beads, and the like, and is 0.1 parts by mass to 30 parts by mass, preferably 0.5 parts by mass to 15 parts by mass, more preferably 1 part by mass to 10 parts by mass, based on 100 parts by mass of the base resin.

The expanding step may include the step of generating the above-described high-temperature peak before expanding the resin bead. As a method for generating a high-temperature peak, for example, a method for performing a heat treatment in which the resin bead is held within a specific temperature range in a dispersion medium in a sealed container can be employed. The timing at which the heat treatment is performed is not particularly limited, and the heat treatment may be performed at any of the time points before, during, and after impregnation of the expanding agent, or may be performed across two or more of the time points described above. By this heat treatment, expanded bead can be obtained which have a crystal structure showing a melting peak derived from a crystal intrinsic to the polyolefin-based resin (intrinsic peak) and a melting peak located on the high-temperature side with respect to the intrinsic peak (high-temperature peak).

<Second Expanding Step>

The production method may further include a second expanding step of impregnating a first-step expanded bead obtained in the expanding step with an inorganic physical expanding agent in a pressure-resistant container to increase the pressure in cells of the first-step expanded bead, and then heating the first-step expanded bead taken out from the pressure-resistant container under a pressure lower than the pressure in the cells to reduce the bulk density of the first-step expanded bead.

In the production method, an expanded bead having a low density can be more easily obtained by expanding the resin bead in two steps, i.e. the expanding step and the second expanding step. When the resin bead is expanded in two steps, it is easier to reduce variation in cell diameter of the expanded beads at the same bulk density as compared to a case where the resin bead is expanded in one step. In this case, it is possible to more effectively suppress occurrence of unevenness in color tone in the molded article of expanded beads, and obtain a molded article of expanded beads which has excellent flame retardancy.

More specifically, for example, the second expanding step is carried out as follows. First, first-step expanded bead to be used in the second expanding step is provided. As the first-step expanded bead to be used in the second expanding step, a first-step expanded bead cured under atmospheric pressure after completion of the expanding step are preferably used. As a method for curing the first-step expanded bead, the same method as a conventional curing method can be employed.

After the first-step expanded bead is provided, the first-step expanded bead is placed in a pressure-resistant container that can be pressurized. Subsequently, the inside of the pressure-resistant container is pressurized by supplying an inorganic physical expanding agent into the pressure-resistant container, so that the first-step expanded bead is impregnated with the inorganic physical expanding agent. By impregnating the first-step expanded bead with the inorganic physical expanding agent in this manner, the pressure of the inside of the cells of the first-step expanded bead can be made higher than that before the impregnation.

In the second expanding step, the first-step expanded bead in the pressure-resistant container may be heated and pressurized. In this case, impregnation of the inorganic physical expanding agent into the first-step expanded bead can be further promoted. When the first-step expanded bead is heated in the second expanding step, the temperature for heating the first-step expanded bead is preferably lower than the melting point of the resin forming the expanded bead from the viewpoint of suppressing blocking, i.e. a phenomenon in which the first-step expanded beads are fused together to form a lump.

As the inorganic physical expanding agent for use in the second expanding step, carbon dioxide, nitrogen, air, steam, and the like can be used. These inorganic physical expanding agents may be used alone, or used in combination of two or more thereof. In the second expanding step, air, which is easy to handle, is preferably used as an inorganic physical expanding agent.

The pressure in cells (internal pressure) of the first-step expanded bead used in the second expanding step can be measured by, for example, the method described in Patent Document 1.

After the impregnation of the inorganic physical expanding agent into the first-step expanded bead is completed, the first-step expanded bead is taken out from the pressure-resistant container. By heating the first-step expanded bead with steam or the like at a pressure lower than the pressure of the inside of the cells, each cell can be expanded. As a result, the bulk density of the first-step expanded bead can be reduced to thereby obtain an expanded bead having a desired bulk density. The bulk density of the expanded beads obtained after the second expanding step is preferably 10 to 30 kg/$m^3$.

In the present specification, the container to be used in the expanding step is referred to as a "sealed container", and the container to be used in the second expanding step is referred to as a "pressure-resistant container". However, each of these containers may be any container which can be sealed and to which pressure can be applied, and for both the containers, the same container may be used.

EXAMPLES

Examples of the polyolefin-based resin expanded bead, the method for producing the same, and the molded article of polyolefin-based resin expanded beads will be described below. Specific aspects of the expanded bead, the method for producing the same, and the molded article of expanded beads according to the present invention are not limited to the following examples, and the configuration can be appropriately changed as long as the spirit of the present invention is not impaired.

Examples 1 to 5 and Comparative Examples 6 and 7

<Bead Forming Step>

A base resin, carbon black, a flame-retardant, and a cell adjusting agent were supplied to an extruder, and these components were kneaded in the extruder and extruded to prepare a strand containing these components. Thereafter, the obtained strand was cut with a pelletizer to obtain resin beads having a length/diameter ratio of 2.0 and an average mass of 1.0 mg.

Specifically, the base resins in Examples 1 to 5 and Comparative Examples 6 and 7 are propylene-ethylene random copolymers in which the content of an ethylene-derived component is 3.1 mass %. The propylene-ethylene random copolymer has a melt flow index of 7.3 g/10 min under a load of 2.16 kg at 230° C., a density of 900 kg/$m^3$, a melting point of 141.2° C., and a melting end temperature of 155.0° C.

As the flame-retardant, bis(1-undecaneoxy-2,2,6,6-tetramethylpiperidin-4-yl)carbonate ("ADK STAB FP-T80" manufactured by ADEKA Corporation, molecular weight: 681) was used. Specifically, the flame-retardants used in Examples 1 to 5 and Comparative Examples 6 and 7 have a chemical structure represented by the following structural formula (II). The blending amount of the flame-retardant was set to be the ratio shown in Tables 1 and 2 based on 100 parts by mass of the base resin. The "ADK STAB" described above is a registered trademark of ADEKA Corporation. The molecular weight of the hindered amine-based compound is a catalog value.

[Chemical Formula 4]

(II)

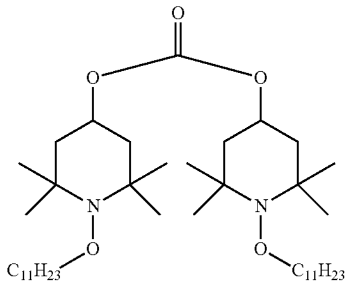

As the carbon black, furnace black was used. The blending amount of the carbon black was set to be the ratio shown in Tables 1 and 2 based on 100 parts by mass of the base resin. As the cell adjusting agent, zinc borate powder was used. The blending amount of the cell adjusting agent was 0.05 parts by mass based on 100 parts by mass of the base resin.

<Expanding Step>

In an autoclave having an internal volume of 5 L, 0.3 parts by mass of a dispersant, 0.01 parts by mass of a dispersion aid, 0.004 parts by mass of a surfactant, and 300 parts by mass of a dispersion medium, based on 100 parts by mass of resin beads were enclosed. In Examples 1 to 5 and Comparative Examples 6 and 7, kaolin was used as the dispersant, aluminum sulfate was used as the dispersion aid, sodium dodecylbenzenesulfonate was used as the surfactant, and water was used as the dispersion medium.

Subsequently, carbon dioxide was supplied into the autoclave as an expanding agent, and the inside of the autoclave was pressurized to a gauge pressure of 1.0 MPa (G). The unit of pressure denoted by (G) means a gauge pressure, i.e. a value of pressure with respect to the atmospheric pressure. Thereafter, the inside of the autoclave was heated at a temperature rise rate of 2° C./min to 144° C. while the inside of the autoclave was stirred. After the temperature of the inside of the autoclave reached 144° C., this temperature was maintained for 15 minutes while stirring was continued.

Subsequently, the inside of the autoclave was heated at a temperature rise rate of 2° C./min to 149° C. while the inside of the autoclave was stirred. After the temperature of the inside of the autoclave reached 149° C., a temperature of 149° C. was maintained for 15 minutes while carbon dioxide was supplied into the autoclave to adjust the pressure of the inside of the autoclave to 2.3 MPa (G). Thereafter, carbon dioxide was supplied into the autoclave to increase the pressure of the inside of the autoclave to 2.35 MPa (G), and the autoclave was opened while back pressure was applied, thereby discharging the contents to atmospheric pressure. Thus, the resin beads were expanded to obtain first-step expanded beads.

<Second Expanding Step>

The first-step expanded beads obtained in the expanding step were cured by being left in an environment at an air temperature of 23° C. and a relative humidity of 50% and at 1 atm for 24 hours, and the cured first-step expanded beads were then charged in the pressure-resistant container. Subsequently, air as an inorganic physical expanding agent was injected into the pressure-resistant container, and the pressure of the inside of the pressure-resistant container was increased from normal pressure to 0.60 MPa (G) over 24 hours. This pressure was maintained for 24 hours to impregnate the cells with the inorganic physical expanding agent. The pressures (gauge pressures) of the inside of cells of the first-step expanded beads taken out from the pressure-resistant container were values shown in Tables 1 and 2.

Next, the first-step expanded beads taken out from the pressure-resistant container were filled in a second expanding machine, and saturated water vapor having a pressure (gauge pressure) as shown in the "steam pressure" columns of Tables 1 and 2 was supplied to increase the temperature of the first-step expanded beads to a temperature as shown in Tables 1 and 2. This temperature was maintained for 15 seconds, the pressure-resistant container was then opened to discharge the contents to atmospheric pressure, thereby further expanding the first-step expanded beads. Thus, expanded beads were obtained.

The method for measuring the pressure of the inside of the cells of the first-step expanded beads is as follows. First, the first-step expanded beads impregnated with the inorganic physical expanding agent were taken out from the pressure-resistant container. Subsequently, the first-step expanded beads were put in a polyethylene bag of about 70 mm×100 mm which was provided with a large number of needle holes each having a size which did not allow the first-step expanded beads to pass through the hole but allowed air to freely pass through the hole. Then, the polyethylene bag containing the first-step expanded beads was transferred to a thermostatic chamber under atmospheric pressure at an air temperature of 23° C. and a relative humidity of 50% within 60 seconds after the first-step expanded beads were taken out from the pressure-resistant container. When a duration time after the first-step expanded beads were taken out from the pressure-resistant container was reached at 120 seconds, a mass Q (unit: g) of the first-step expanded beads was measured in the thermostatic chamber. The mass Q of the first-step expanded beads does not include the mass of the polyethylene bag.

After the measurement of the mass Q, the polyethylene bag containing the first-step expanded beads was left standing in the thermostatic chamber for 48 hours. Thereafter, a mass U (unit: g) of the first-step expanded beads was measured. The mass U of the first-step expanded beads does not include the mass of the polyethylene bag.

While the first-step expanded beads are left standing in the thermostatic chamber, a gas such as an inorganic physical expanding agent present in the cells of the first-step expanded beads pass through cell films due to a pressure difference between the pressure of the inside of the cells and the atmospheric pressure, and naturally discharged to the outside of the first-step expanded beads. As a result, the pressure of the inside of the cells of the first-step expanded beads left standing in the thermostatic chamber for 48 hours decreases to a level equivalent to atmospheric pressure. Therefore, a mass W (unit: g) of the inorganic physical expanding agent impregnated in the pressure-resistant container can be calculated by subtracting the mass U of the first-step expanded beads left standing in the thermostatic chamber for 48 hours from the mass Q of the first-step expanded beads.

By converting the thus-obtained mass W (unit: g) of the inorganic physical expanding agent into a substance amount (unit: mol), and then substituting the substance amount into the equation of state of ideal gas shown in the following mathematical expression (2), a pressure P (unit: MPa (G)) of the inside of the cells of the first-step expanded beads at the time of impregnation of the inorganic physical expanding agent can be calculated. The value of the pressure P calculated in this manner is a gauge pressure, i.e. a pressure of the inside of cells with respect to atmospheric pressure.

$$P=(W/M)\times R\times T/V \qquad (2)$$

In the above expression (2), the symbol M is a molar mass (unit: g/mol) of the inorganic physical expanding agent, R is a gas constant, T (unit: K) is a temperature of the thermostatic chamber, and V (unit: L) is a volume of cells. In this example, the molar mass M of the inorganic physical expanding agent is an average molar mass of air, which is 28.8 g/mol, and the temperature T of the thermostatic chamber is 296 K. The gas constant R was 0.0083 MPa·L/(K·mol).

The volume V of the cells is a value calculated by subtracting the volume of the base resin in the first-step expanded beads from the apparent volume of the first-step expanded beads. The method for calculating the volume V of cells is specifically as follows. First, a first-step expanded bead group including 500 or more first-step expanded beads was provided separately from the first-step expanded beads used for the measurement of the pressure of the inside of the cells. The first-step expanded bead group was left standing in an environment at a temperature of 23° C. and a relative humidity of 50% and at 1 atm for 2 days. Subsequently, a measuring cylinder containing ethanol at a temperature of 23° C. was provided, and the first-step expanded bead group was immersed in ethanol in the measuring cylinder by using a wire mesh or the like. An apparent density W1/V1 (unit: g/L) of the first-step expanded beads can be obtained by measuring a volume V1 (unit: L) of the first-step expanded bead group which is read from a rise in water level, and then dividing a mass W1 (unit: g) of the first-step expanded bead group by the volume.

An apparent volume (unit: L) of the first-step expanded beads used for the measurement of the pressure of the inside of the cells can be calculated by dividing the mass U of the first-step expanded beads left standing in the thermostatic chamber for 48 hours by the apparent density W1/V1 of the first-step expanded beads. A volume (unit: L) of the base resin in the first-step expanded beads used for the measurement of the pressure of the inside of the cells can be calculated by dividing the mass U of the first-step expanded beads left standing in the thermostatic chamber for 48 hours by the density of the base resin which is subjected to unit conversion. Therefore, a volume V (unit: L) of the cells can be obtained by subtracting the volume of the base resin in the first-step expanded beads from the apparent volume of the first-step expanded beads which is calculated as described above.

<In-Mold Molding>

In this example, in-mold molding of the expanded beads obtained by the above-described method was performed to prepare a flat plate-shaped molded article of expanded beads which has a size of 350 mm in length, 200 mm in width and 50 mm in thickness. First, the expanded beads were left standing in an environment of a temperature of 40° C. and a relative humidity of 20% and at 1 atm for 24 hours to be dried, and the expanded beads were then charged in a pressure-resistant container. Air was injected into the pressure-resistant container, and the pressure of the inside of the pressure-resistant container was increased from normal pressure to 0.15 MPa (G) over 12 hours. This pressure was maintained for 12 hours to impregnate the cells with air. The pressures of the inside of cells of the expanded beads taken out from the pressure-resistant container were values shown in Tables 1 and 2. The method for measuring the pressure of the inside of the cells of the expanded beads is the same as the method for measuring the pressure of the inside of the cells of the first-step expanded beads.

Next, the expanded beads taken out from the pressure-resistant container were filled in a mold capable of molding a molded article of expanded beads which had the above-described size. Saturated water vapor having a gauge pressure as shown in the "molding pressure" columns of Tables 1 and 2 was supplied into the mold to perform in-mold molding. Thus, a molded article of expanded beads which had the above-described size was obtained.

Example 6

Example 6 has the same configuration as in Examples 1 to 5 except that as the flame-retardant, the compound used in Examples 1 to 5 and "Flamestab NOR 116" manufactured by BASF SE were used in combination. The production method of Example 6 is the same as the production methods of Examples 1 to 5 except that the flame-retardant was changed as described above.

Specifically, the flame-retardants used in this example has a chemical structure represented by the following structural formula (III). "Flamestab" is a registered trademark of BASF SE.

[Chemical Formula 5]

(III)

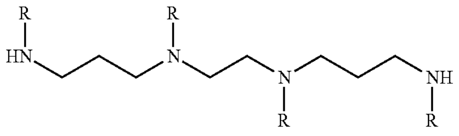

-continued

R =

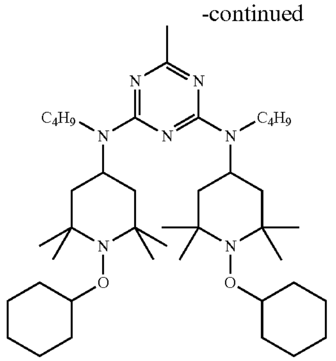

Comparative Examples 1 to 5

Comparative Examples 1 to 5 have the same configuration as in Examples 1 to 5 except that as the flame-retardant, "Flamestab NOR 116" manufactured by BASF SE was used. The production methods of Comparative Examples 1 to 5 are the same as the production methods of Examples 1 to 5 except that the flame-retardant was changed as described above.

(First-Step Expanded Bead and Expanded Bead)

The physical properties of the first-step expanded bead(s) and expanded bead(s) of examples and comparative examples are measured as follows.

<High-Temperature Peak Heat Amount and Total Heat Amount>

The measurement sample to be used for measuring the high-temperature peak heat amount and the total heat amount may be first-step expanded bead(s) or expanded bead(s). In this example, differential scanning calorimetry was performed with the first-step expanded bead(s) as a measurement sample. Specifically, about 2 mg of the first-step expanded bead(s) were provided as a test piece, and the test piece was heated and melted in accordance with Testing Methods for Heat of Transition of Plastics as described in JIS K 7122-1987, so that a DSC curve at the time was obtained. The measurement temperature range was from 30° C. to a temperature 30° C. higher than that at the end of the melting peak, and the temperature rise rate during heating was 10° C./min.

The endothermic peak in the DSC curve thus obtained was divided into an intrinsic peak ΔH1 and a high-temperature peak ΔH2 by the above-described method (see FIG. 1). The sum of the area of the intrinsic peak ΔH1 and the area of the high-temperature peak ΔH2 was taken as a value of the total heat amount, and the area of the high-temperature peak ΔH2 was taken as a value of the high-temperature peak heat amount. The high-temperature peak heat amount and the total heat amount of the first-step expanded bead in each of Examples 1 to 6 were as shown in Table 1. The high-temperature peak heat amount and the total heat amount of the first-step expanded bead in each of Comparative Examples 1 to 7 were as shown in Table 2.

<First-Step Ratio and Bulk Density of First-Step Expanded Beads>

500 or more first-step expanded beads were left standing in an environment at a temperature of 23° C. and a relative humidity of 50% and at 1 atm for 24 days. First-step expanded beads thus obtained were charged in a measuring cylinder so as to naturally accumulate, and the bulk volume (unit: L) of the first-step expanded beads was read on the scale of the measuring cylinder. The bulk density (unit: $kg/m^3$) of the first-step expanded beads was obtained by performing unit conversion of a value obtained by dividing the mass (unit: g) of the first-step expanded beads in the measuring cylinder by the bulk volume (unit: L) described above. A first-step ratio was calculated by dividing the density of the base resin by the bulk density of the first-step expanded beads. The first-step ratio and the bulk density of the first-step expanded beads in each of Examples 1 to 6 were as shown in Table 1. The first-step ratio and the bulk density of the first-step expanded beads in each of Comparative Examples 1 to 7 were as shown in Table 2.

<Bulk Ratio X and Bulk Density of Expanded Beads>

The method for measuring the bulk ratio X and the bulk density of the expanded beads is the same as the above-described method for measuring the first-step ratio and the bulk density of the first-step expanded beads except that the expanded beads are used instead of the first-step expanded beads. The bulk ratio X and the bulk density of the expanded beads in each of Examples 1 to 6 were as shown in Table 1. The bulk ratio X and the bulk density of the expanded beads in each of Comparative Examples 1 to 7 were as shown in Table 2.

<Average Cell Diameter $D_{av}$, Standard Deviation $D_{sd}$, and Variation Coefficient $D_{CV}$ of Expanded Beads>

The expanded beads were divided roughly in half. Thereafter, by using a scanning electron microscope, an enlarged photograph was obtained in which all the cut surfaces exposed by the division fell within the field of view. On the enlarged photograph, two line segments were drawn from the outermost surface of the expanded beads to the opposite outermost surface through the central portion in such a manner that the angles formed by the adjacent line segments were equal to each other. That is, two line segments were drawn in such a manner that the angle formed by the adjacent line segments was 90°. By dividing the sum of the lengths of the thus-obtained two line segments by the total number of cells intersecting the line segments, the cell diameters (unit: μm) of individual expanded beads were calculated. The above operation was performed on randomly extracted 50 expanded beads, and a value obtained by arithmetically averaging the obtained cell diameters of the expanded beads was taken as an average cell diameter $D_{av}$ of the expanded beads.

A standard deviation $D_{sd}$ and a variation coefficient $D_{CV}$ were calculated by using the calculated cell diameters of the 50 expanded beads. The standard deviation $D_{sd}$ of cell diameters is a square root of an unbiased variance of the cell diameters. The variation coefficient $D_{CV}$ (unit:%) of the expanded beads is a value obtained by expressing a ratio of the standard deviation $D_{sd}$ of cell diameters to the average cell diameter $D_{av}$, $D_{sd}/D_{av}$, as a percentage. The average cell diameter $D_{av}$, the standard deviation $D_{sd}$, and the variation coefficient $D_{CV}$ of expanded beads in each of examples were as shown in Table 1. The average cell diameter $D_{av}$, the standard deviation $D_{sd}$, and the variation coefficient $D_{CV}$ of expanded beads in each of Comparative Examples 1 to 7 were as shown in Table 2.

<Average Cell Diameter $d_{av}$, Standard Deviation $d_{sd}$ and Variation Coefficient $d_{CV}$ of Cell Diameters, of First-Step Expanded Beads>

The method for measuring the average cell diameter $d_{av}$, and the standard deviation $d_{sd}$ and the variation coefficient $d_{CV}$ of cell diameters, of the first-step expanded beads, is the same as the above-described method for measuring the average cell diameter $D_{av}$, the cell diameter standard deviation $D_{sd}$, and the variation coefficient $D_{CV}$ of the expanded beads except that first-step expanded beads are used instead of expanded beads. The average cell diameter $d_{av}$, and the standard deviation dad and the variation coefficient $d_{CV}$ of cell diameters, of first-step expanded beads in each of Examples 1 to 6 were as shown in Table 1. The average cell diameter $d_{av}$, and the standard deviation $d_{sd}$ and the variation coefficient $d_{CV}$ of cell diameters, of first-step expanded beads in each of Comparative Examples 1 to 7 were as shown in Table 2.

(Molded Article of Expanded Beads)

The method for evaluating the characteristics of the molded article of expanded beads which is obtained by in-mold molding of expanded beads in each of examples and comparative examples is as follows.

<Molded Article Density>

A value obtained by dividing the mass of the molded article of expanded beads by a volume calculated on the basis of the size was taken as a molded article density (unit: $kg/m^3$). The molded article density of the molded article of expanded beads in each of Example 1 to 6 was as shown in Table 1. The molded article density of the molded article of expanded beads in each of Comparative Examples 1 to 7 was as shown in Table 2.

<Flame Retardancy>

Flame retardancy was evaluated by a method conforming to the flammability test method specified in FMVSS (Federal Motor Vehicle Safety Standard) No. 302. Specifically, first, the molded article of expanded beads was cut to prepare a test body which has a plate shape having a length of 350 mm, a width of 102 mm, and a thickness of 12.7 mm and in which one of surfaces surrounded by a side having a length of 350 mm and a side having a width of 102 mm was a skin surface. In the test body, a start line was drawn at a position 38 mm away from a base end in a length direction, and an end line was drawn at a position 138 mm away from the base end. With the use of this test body, a flammability test was conducted in the same manner as in FMVSS No. 302 with the skin surface being in contact with a flame of a burner.

The symbols described in the "flame retardancy" columns of Tables 1 and 2 have the following meanings.

A: The burning of the test body ended before reaching the start line.

B: The burning of the test body continued and extended beyond the start line and the burning speed from the start line to the burning end position was 102 mm/min or less.

C: The burning of the test body continued and extended beyond the start line and the burning speed from the start line to the burning end position was more than 102 mm/min.

For symbols "B" and "C" indicating that the burning of the test body extended beyond the start line, the value of the highest burning speed among the burning speeds of the three test bodies is shown in the "burning speed" column of Table 1. For symbol "A" indicating that the burning of the test body ended before extending beyond the start line, symbol is described in the "burning speed" column. The "burning speed" is a value obtained by dividing a distance (unit: mm) between the start line and the burning end position by the burning duration (unit: minute) until the burning ended after the burning position reached the start line.

<Appearance Characteristics>

30 measurement positions were randomly selected from a skin surface surrounded by a side having a length of 350 mm and a side having a width of 200 mm in the molded article of expanded beads. The color tone at each of these measurement positions was measured with a spectrophotometric colorimeter ("CM-5" manufactured by KONICA MINOLTA JAPAN, INC.) to obtain color coordinates in the CIE 1976 L*a*b* color space. The color tone was obtained by reflection measurement. The measurement diameter was φ8 mm, and the measurement method was a SCE method.

In evaluation of appearance characteristics, a difference between the maximum value and the minimum value of the L* value obtained at each of the above-described 30 measurement positions was used. Specifically, in the "evaluation" columns of Tables 1 and 2, symbol "A" is described when the difference between the maximum value and the minimum value of the L* value is less than 3, symbol "B" is described when the difference is 3 or more and less than 4, symbol "C" is described when the difference is 4 or more and less than 5, and symbol "D" is described when the difference is 5 or more. The L* value is an indication of brightness, and the larger the L* value, the higher the brightness. The smaller the difference between the maximum value and the minimum value of the L* value, the smaller the difference in brightness and the smaller the color unevenness.

TABLE 1

| | | | Example 1 | Example 2 | Example 3 | Example 4 | Example 5 | Example 6 |
|---|---|---|---|---|---|---|---|---|
| Flame-retardant | Type | — | FP-T80 | FP-T80 | FP-T80 | FP-T80 | FP-T80 | FP-T80/NOR116 |
| | Blending Amount | Parts by mass | 0.10 | 0.10 | 0.10 | 0.05 | 0.50 | 0.05/0.05 |
| Carbon Black | Blending Amount | Parts by mass | 2.6 | 2.6 | 2.6 | 2.6 | 2.6 | 2.6 |
| First-step Expanded Bead | Heat of High-temperature Peak | J/g | 14.8 | 14.8 | 14.9 | 14.9 | 15 | 14.6 |
| | Total Heat Amount | J/g | 67.2 | 67.2 | 69.0 | 71.2 | 70.1 | 69.4 |
| | First-step Ratio | Times | 17.8 | 17.8 | 17.0 | 18.0 | 17.6 | 18.8 |
| | Bulk Density | $kg/m^3$ | 50.6 | 50.6 | 52.9 | 50.0 | 51.1 | 47.9 |
| | Average Cell Diameter $d_{av}$ | μm | 84 | 84 | 95 | 77 | 99 | 88 |
| | Standard Deviation $d_{sd}$ | μm | 11.7 | 11.7 | 12.2 | 9.1 | 14.5 | 12.4 |
| | Variation Coefficient $d_{CV}$ | % | 13.9 | 13.9 | 12.8 | 11.8 | 14.6 | 14.1 |
| Second Expanding Step | Pressure in Cells of First-step Expanded Bead | MPa(G) | 0.58 | 0.58 | 0.60 | 0.58 | 0.58 | 0.58 |
| | Steam Pressure | MPa(G) | 0.18 | 0.16 | 0.16 | 0.18 | 0.18 | 0.18 |
| | Heating Temperature | ° C. | 102 | 96 | 96 | 101 | 102 | 103 |
| Second Expanded Bead | Bulk Ratio X | Times | 49.5 | 40.4 | 32.2 | 56.0 | 51.3 | 52.2 |
| | Bulk Density | $kg/m^3$ | 18.2 | 22.3 | 28.0 | 16.1 | 17.5 | 17.2 |
| | Average Cell Diameter $D_{av}$ | μm | 144 | 130 | 116 | 126 | 150 | 168 |
| | Standard Deviation $D_{sd}$ | μm | 28.2 | 18.6 | 12.5 | 14.1 | 30.2 | 24.4 |
| | Variation Coefficient $D_{CV}$ | % | 19.6 | 14.3 | 10.8 | 11.2 | 20.1 | 14.5 |
| Molded Article of Expanded Beads | Pressure in Cells of Expanded Bead | MPa(G) | 0.11 | 0.12 | 0.12 | 0.12 | 0.12 | 0.12 |
| | Molding Pressure | MPa(G) | 0.22 | 0.18 | 0.22 | 0.22 | 0.22 | 0.22 |
| | Molded Article Density | $kg/m^3$ | 20.5 | 25.2 | 29.2 | 19.2 | 19.8 | 19.8 |
| Flame Retardancy | Burning Speed | mm/min | — | — | — | — | — | — |
| | Evaluation | — | A | A | A | A | A | A |
| Appearance Characteristics | Evaluation | | C | B | A | B | C | C |

TABLE 2

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Flame-retardant | Type | — | NOR116 | NOR116 | NOR116 | NOR116 | NOR116 | FP-T80 | FP-T80 |
| | Blending Amount | Parts by mass | 0.10 | 0.10 | 0.10 | 0.05 | 0.5 | 3 | 0.002 |
| Carbon Black | Blending Amount | Parts by mass | 2.6 | 2.6 | 2.6 | 2.6 | 2.6 | 2.6 | 2.6 |
| First-step Expanded Bead | Heat of High-temperature Peak | J/g | 15.1 | 15.1 | 15.6 | 15.7 | 13.7 | 14.0 | 14.3 |
| | Total Heat Amount | J/g | 66.8 | 66.8 | 68.1 | 70.9 | 68.3 | 68.5 | 66.0 |
| | First-step Ratio | Times | 18.8 | 18.8 | 16.0 | 15.4 | 17.6 | 18.0 | 18.5 |
| | Bulk Density | $kg/m^3$ | 47.9 | 47.9 | 56.3 | 58.4 | 51.1 | 50.0 | 48.6 |
| | Average Cell Diameter $d_{av}$ | μm | 137 | 137 | 108 | 75 | 84 | 95 | 97 |
| | Standard Deviation $d_{sd}$ | μm | 26.5 | 26.5 | 21.6 | 12.5 | 19.5 | 18.5 | 12.5 |
| | Variation Coefficient $d_{CV}$ | % | 19.3 | 19.3 | 20.0 | 16.7 | 23.2 | 19.5 | 12.9 |
| Second Expanding Step | Pressure in Cells of First-step Expanded Bead | MPa(G) | 0.58 | 0.58 | 0.60 | 0.59 | 0.58 | 0.58 | 0.58 |
| | Steam Pressure | MPa(G) | 0.18 | 0.16 | 0.16 | 0.19 | 0.18 | 0.18 | 0.18 |
| | Heating Temperature | ° C. | 102 | 97 | 95 | 105 | 103 | 103 | 102 |
| Second Expanded Bead | Bulk Ratio X | Times | 53.0 | 43.0 | 33.3 | 53.0 | 52.2 | 50.8 | 53.6 |
| | Bulk Density | $kg/m^3$ | 17.0 | 20.9 | 27.0 | 17.0 | 17.2 | 17.7 | 16.8 |
| | Average Cell Diameter $D_{av}$ | μm | 160 | 179 | 134 | 133 | 131 | 135 | 152 |
| | Standard Deviation $D_{sd}$ | μm | 45.5 | 35.1 | 21.4 | 31.7 | 39.4 | 42.5 | 20.7 |
| | Variation Coefficient $D_{CV}$ | % | 28.4 | 19.6 | 16.0 | 23.8 | 30.1 | 31.5 | 13.6 |
| Molded Article of Expanded | Pressure in Cells of Expanded Bead | MPa(G) | 0.11 | 0.12 | 0.12 | 0.12 | 0.12 | 0.12 | 0.12 |

TABLE 2-continued

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Beads | Molding Pressure | MPa(G) | 0.22 | 0.18 | 0.22 | 0.22 | 0.22 | 0.22 | 0.22 |
| | Molded Article Density | $kg/m^3$ | 19.2 | 25.1 | 29.5 | 20.6 | 20.5 | 20.0 | 20.5 |
| Flame | Burning Speed | mm/min | — | — | — | 101 | — | — | 111 |
| Retardancy | Evaluation | — | A | A | A | B | A | A | C |
| Appearance Characteristics | Evaluation | | D | C | C | D | D | D | B |

As shown in Table 1, in the expanded beads of Examples 1 to 6, carbon black is contained, and the hindered amine-based compound represented by the structural formula (II) is used as a flame-retardant. The blending amount of carbon black and the blending amount of the hindered amine-based compound are each within the above-described specific range. Thus, it is possible to suppress occurrence of unevenness in color tone in the molded article of expanded beads of Examples 1 to 6, and obtain a molded article of expanded beads which has excellent flame retardancy. Hereinafter, Examples and Comparative Examples will be compared in more detail.

The expanded bead of Example 1 contains carbon black and a flame-retardant formed of the specific hindered amine-based compound. Therefore, in the expanded bead of Example 1, it was possible to reduce the variation coefficient of cell diameters and suppress an increase in variation in cell diameter as compared to Comparative Example 1 which is different in type of flame-retardant and comparative in bulk density. As a result, in the molded article of expanded beads which is formed of the expanded beads of Example 1, it was possible to suppress occurrence of unevenness in color tone as compared to the molded article of expanded beads which is formed of the expanded beads of Comparative Example 1.

Similarly, from comparison between Example 2 and Comparative Example 2 and comparison between Example 3 and Comparative Example 3, it can be understood that in the expanded beads of Examples 2 and 3, it is possible to reduce variation in cell diameter as compared to Comparative Examples 2 and 3 which are each different in type of flame-retardant and comparative in bulk density.

The blending amount of the hindered amine-based compound in the expanded bead of Example 4 is smaller than that in the expanded beads of Examples 1 to 3. The expanded bead of Example 4 has a relatively small blending amount of the flame-retardant as described above, but can have a reduced variation coefficient of cell diameters like the expanded beads of Examples 1 to 3. Further, from comparison of Examples 1 to 3 with Example 4, it can be understood that when the specific hindered amine-based compound is used, it is possible to reduce the blending amount of the hindered amine-based compound while maintaining excellent flame retardancy.

On the other hand, the expanded bead of Comparative Example 4 has a larger variation coefficient of cell diameters and larger variation in cell diameter as compared to the expanded bead of Example 4. Therefore, when in-mold molding of the expanded beads of Comparative Example 4 is performed, a portion having a relatively large amount of the base resin and a portion having a relatively small amount of the base resin are easily formed in the molded article of expanded beads. In Comparative Example 4, the flame retardancy improving effect offered by the flame-retardant in Comparative Example 4 is relatively low because the blending amount of the flame-retardant is relatively small. Therefore, in the molded article of expanded beads which is obtained by in-mold molding of the expanded beads of Comparative Example 4, there is a possibility that burning easily continues at a portion having a relatively large amount of the base resin, so that self-extinguishing hardly occurs.

The blending amount of the hindered amine-based compound in the expanded beads of Example 5 is larger than that in the expanded beads of Examples 1 to 3. The expanded beads of Example 5 have a relatively large blending amount of the flame-retardant as described above, but can have a reduced variation coefficient of cell diameters like the expanded beads of Examples 1 to 3. On the other hand, the expanded bead of Comparative Example 5 has a larger variation coefficient of cell diameters and larger variation in cell diameter as compared to the expanded bead of Example 5. From comparison between Example 5 and Comparative Example 5, it can be understood that use of the specific hindered amine-based compound enables occurrence of color unevenness in the molded article of expanded beads to be suppressed by suppressing an increase in variation in cell diameter even when the blending amount of the specific hindered amine-based compound is increased.

The blending amount of the hindered amine-based compound in the expanded bead of Comparative Example 6 is the specific range mentioned above. Therefore, the expanded beads of Comparative Example 6 had larger variation in cell diameter as compared to the expanded beads of Example 1 to 6.

The blending amount of the hindered amine-based compound in the expanded bead of Comparative Example 7 is below the specific range. Therefore, the molded article of expanded beads which is formed of the expanded beads of Comparative Example 7 is inferior in flame retardancy to the molded article of expanded beads which is formed of the expanded beads of Examples 1 to 6.

The invention claimed is:

1. A polyolefin-based resin expanded bead, comprising:

a base resin comprising a polyolefin-based resin in 90 mass % or more, based on the weight of the base resin;

carbon black; and a flame-retardant, wherein a bulk density of the polyolefin-based resin expanded beads is in a range of from 16 to 28 $kg/m^3$, wherein the carbon black is blended into the polyolefin-based resin expanded bead in a range of from 2 to 4 parts by mass, based on 100 parts by mass of the base resin, wherein the flame-retardant comprises a hindered amine-based compound of formula (I):

(I)

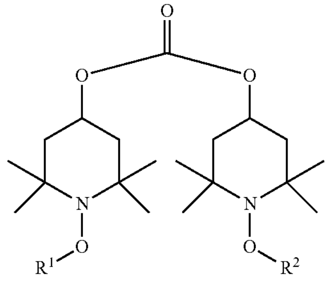

, wherein $R^1$ and $R^2$ are each independently an alkyl group having 1 to 20 carbon atoms, wherein the hindered amine-based compound is blended into the polyolefin-based resin expanded bead in a range of from 0.01 to 0.5 parts by mass, based on 100 parts by mass of the base resin, wherein the polyolefin-based resin expanded beads have an average cell diameter in a range of from 70 to about 180 μm, and wherein a plurality of the polyolefin-based resin expanded beads has a $D_{CV}/X$ ratio, of the variation coefficient $D_{CV}$ to a bulk ratio X, of 0.15 to 0.38.

2. The polyolefin-based resin expanded bead of claim 1, wherein the hindered amine-based compound has a molecular weight in a range of from 600 to 800.

3. The polyolefin-based resin expanded bead of claim 1, wherein the bulk density of the plurality of the polyolefin-based resin expanded beads is in a range of from 16 to 20 $kg/m^3$.

4. The polyolefin-based resin expanded bead of claim 1, wherein the $D_{CV}/X$ ratio of the plurality of the polyolefin-based resin expanded beads is in a range of from 0.28 to 0.15.

5. The polyolefin-based resin expanded bead of claim 1, wherein the $D_{CV}/X$ ratio of the plurality of the polyolefin-based resin expanded beads is in a range of from 0.20 to 0.15.

6. The polyolefin-based resin expanded bead of claim 1, wherein the $D_{CV}/X$ ratio of the plurality of the polyolefin-based resin expanded beads is in a range of from 0.34 to 0.20.

7. The polyolefin-based resin expanded bead of claim 1, wherein the $D_{CV}/X$ ratio of the plurality of the polyolefin-based resin expanded beads is in a range of from 0.34 to 0.28.

8. The polyolefin-based resin expanded bead of claim 1, wherein the $D_{CV}/X$ ratio of the plurality of the polyolefin-based resin expanded beads is in a range of from 0.28 to 0.20.

9. The polyolefin-based resin expanded bead of claim 2, wherein the $D_{CV}/X$ ratio of the plurality of the polyolefin-based resin expanded beads is in a range of from 0.34 to 0.20.

10. The polyolefin-based resin expanded bead of claim 2, wherein the $D_{CV}/X$ ratio of the plurality of the polyolefin-based resin expanded beads is in a range of from 0.34 to 0.28.

11. The polyolefin-based resin expanded bead of claim 2, wherein the $D_{CV}/X$ ratio of the plurality of the polyolefin-based resin expanded beads is in a range of from 0.28 to 0.20.

12. The polyolefin-based resin expanded bead of claim 3, wherein the $D_{CV}/X$ ratio of the plurality of the polyolefin-based resin expanded beads is in a range of from 0.34 to 0.20.

13. The polyolefin-based resin expanded bead of claim 3, wherein the $D_{CV}/X$ ratio of the plurality of the polyolefin-based resin expanded beads is in a range of from 0.34 to 0.28.

14. The polyolefin-based resin expanded bead of claim 3, wherein the $D_{CV}/X$ ratio of the plurality of the polyolefin-based resin expanded beads is in a range of from 0.28 to 0.20.

15. A molded article, obtained by in-mold molding of the plurality of the polyolefin-based resin expanded beads of claim 1.

16. The molded article of claim 15, having a self-extinguishing property in a flammability test specified in FMVSS No. 302.

17. A molded article, obtained by in-mold molding of the plurality of the polyolefin-based resin expanded beads of claim 2.

18. A method for producing the polyolefin-based resin expanded bead of claim 1, the method comprising:

expanding an expandable polyolefin-based resin bead comprising the base resin, the carbon black, the flame-retardant, and an expanding agent, dispersed in an aqueous medium in a sealed container by discharging the expandable polyolefin-based resin bead together with the aqueous medium from the sealed container to a pressure lower than that in the sealed container.

19. The method of claim 18, wherein the expanding further comprises impregnating a polyolefin-based resin beads dispersed in the aqueous medium in the sealed container with the expanding agent, to obtain the expandable polyolefin-based resin bead, and wherein the polyolefin-based resin bead comprises the base resin, the carbon black, and the flame retardant.

20. The method of claim 18, further comprising:

putting the expanded bead obtained in the expanding in a pressure-resistant container, impregnating the expanded bead with an additional inorganic physical expanding agent to increase a pressure in cells of the expanded bead, and then heating the expanded bead taken out from the pressure-resistant container under a pressure lower than the pressure in the cells to reduce the bulk density of the expanded bead and obtain twice expanded bead.

* * * * *